United States Patent Office 3,555,703
Patented Jan. 19, 1971

3,555,703
EQUIPMENT FOR TEACHING MATHEMATICS
Georges Papy and Frederique Papy, nee Lenger, Brussels, Belgium, assignors to International Standard Electric Corporation, New York, N.Y., a corporation of Delaware
Filed Dec. 26, 1968, Ser. No. 786,949
Claims priority, application Netherlands, Dec. 29, 1967, 6717885
Int. Cl. G09b *19/02*
U.S. Cl. 35—30
8 Claims

ABSTRACT OF THE DISCLOSURE

Equipment for teaching mathematics including means with a plurality of areas and a plurality of elements which represent each a magnitude and are each selectively positionable on said areas; said plurality of areas represent powers of a same radix R and said elements each represent one of the values from 1 to R−1.

---

The present invention relates to an equipment for teaching mathematics including means with a plurality of areas and a plurality of elements which represent each a magnitude and are each selectively positionable on said areas.

Such an equipment is already known from U.S. Patent No. 3,267,590. Therein the magnitudes represented by the elements are constituted by the values of a digit in a decimal number system and mathematical calculations are represented in this system.

It is an object of the present invention to provide an equipment for teaching mathematics in another number system than the decimal one, and more particularly in a binary system and in a binary coded decimal system.

The equipment for teaching mathematics according to the invention is particularly characterized in that said areas represent different magnitudes and that one or more of said elements positioned on each of said areas represent the product of the magnitude of the area by the sum of the magnitudes of the elements positioned thereon.

The above mentioned and other objects and features of the invention will become more apparent and the invention itself will be best understood by referring to the following description of embodiments taken in conjunction with the accompanying drawings wherein:

FIG. 1 represents a first embodiment of an equipment for teaching mathematics according to the invention;

FIG. 2 shows the equipment of FIG. 1 used for teaching an adding operation;

FIG. 3 shows the equipment of FIG. 1 used for teaching a subtraction operation;

FIG. 4 shows the equipment of FIG. 1 used for teaching a multiplication operation;

FIG. 5 represents a second embodiment of an equipment for teaching mathematics according to the invention;

FIG. 6 shows the equipment of FIG. 5 used for teaching an adding operation;

FIG. 7 shows the equipment of FIG. 5 used for teaching a subtraction operation;

FIG. 8 represents a third embodiment of an equipment for teaching mathematics according to the invention.

Before considering the various figures it should be noted that any number N may be represented in a number system with base or radix R by a sum of partial products:

$$N = d_n R^n + d_{n-1} R^{n-1} + \ldots + d_1 R^1 + d_0 R^0$$

wherein the bits $d_n, d_{n-1} \ldots d_1, d_0$ each have one of the values 0 to R−1.

The equipment for teaching mathematics shown in FIG. 1 is based on the fact that any number N may be represented in a number system with base or radix R=2, i.e. in a binary number system, by a sum of partial products:

$$N = d_n 2^n + d_{n-1} 2^{n-1} + \ldots + d_1 2^1 + d_0 2^0$$

wherein the bits $d_n, d_{n-1} \ldots d_1, d_0$ each have one of two values 0 or 1 and are therefore called binary bits.

Since some of the binary bits $d_0$ to $d_n$ may be zero it may be said that any number N may be represented in a binary number system by a sum of partial products of binary bits equal to 1 and corresponding power values of 2. For instance in the binary number system, number 54 is represented by $$1.2^5 + 1.2^4 + 0.2^3 + 1.2^2 + 1.2^1 + 0.2^0$$

or $$1.2^5 + 1.2^4 + 1.2^2 + 1.2^1$$

The equipment of FIG. 1 includes a board B and a plurality of circular elements such as E. The upper surface of board B is divided in $n+1$ identical juxtaposed square areas $A_0$ to $A_n$ of different colors as represented by the dashed lines of FIG. 1. The elements such as E are so coloured that when positioned on the areas $A_0$ to $A_n$ they contrast with the colours thereof.

The areas $A_0 \ldots A_x, A_x+1 \ldots A_n$ represent respective ones of the successive powers of radix R=2, i.e. $2^0 \ldots 2^x, 2^{x+1} \ldots 2^n$, and the elements such as E each represent a binary bit of value 1. By positioning an element E on one of the areas $A_0$ to $A_n$, e.g. on $A_x$, the partial product of a binary bit of value 1 by the corresponding power of 2, i.e. $2^x$, is visually represented in binary form on board B, and by positioning one element on each of two or more of the areas $A_0$ to $A_n$, e.g. on $A_x$ and $A_{x+1}$, the number equal to the sum of the respective partial products, i.e. $2^x + 2^{x+1}$, is visually represented in binary form on board B.

For instance, the above number 54 is visually represented in binary form on board B by positioning elements E of value 1 on the areas $A_1, A_2, A_4$ and $A_5$. This is right since $54 = 1.2^5 + 1.2^4 + 1.2^2 + 1.2^1$.

The above described equipment permits +0 visually represent on board B the adding operation of two or more numbers in binary form. In order to do this, one proceeds as follows:

Each of the numbers to be added is visually represented in binary form on board B by means of one or more elements E of value 1 and in the manner indicated above;

Each pair of elements E of value 1 positioned on a same area $A_x$ representing $2^x$ is removed and replaced by an element E of value 1 on the adjacent area $A_{x+1}$ representing $2^{x+1}$. This is correct since two such elements, positioned on area $A_x$ visually represents the sum $2^x + 2$ or $2^{x+1}$, the latter value being also visually represented by an element E of value 1 positioned on the area $A_{x+1}$;

After having performed these simple operations, the result of the adding operation is visually represented in binary form on board B.

For instance, when the adding operation of the numbers 54 and 7 must be visually represented in binary form on board B, one proceeds as follows. Hereby reference is made to FIG. 2:

Number 54 is visually represented in binary form on board B by positioning elements E of value 1 on the areas $A_1, A_2, A_4$ and $A_5$, and number 7 is visually represented in binary form on the same board B by positioning elements E of value 1 on the areas $A_0, A_1$ and $A_2$;

Since two such elements are thus positioned on area $A_1$ they are replaced by an element on area $A_2$. Three elements being then positioned on the latter area $A_2$, two of them are replaced by an element on area $A_3$. At the end of these operations, elements are hence positioned on the areas $A_0$ and $A_2$ to $A_5$, thus visually representing in binary form the sum 61 on board B.

When the subtraction of two numbers must be visually represented in binary form on board B, one proceeds in the following way. Hereby use is made of elements of different colours for the minuend and for the subtrahend or of elements with different indiciae for indicating their function i.e. a plus sign for the minuend and a minus sign for the subtrahend. Anyhow, these elements are hereinafter called plus elements and minus elements:

Each of the numbers is visually represented in binary form on the board B by means of one or more elements and in the manner indicated above;

A plus element and a minus element positioned on a same area are removed;

When a minus element is positioned on an area $Ax$, a plus element positioned on one of the areas $A_{x+1}$ to $A_n$ must be replaced by a plus element on each of the areas of lower rank and by two plus elements on the area $A_x$;

Eventually performing adding operations in the manner described above.

After having performed these relatively simple operations, the result of the substraction operation is visually represented in binary form on board B.

For instance when the substraction of minuend 12 and subtrahend 5 must be visually represented in binary form on board B, one proceeds as follows. Hereby reference is made to FIG. 3:

Minuend 12 is visually represented in binary form on board B by positioning plus elements on the areas $A_2$ and $A_3$, and subtrahend 5 is visually represented in binary form on the same board B by positioning minus elements on the areas $A_0$ and $A_2$;

Since a plus element and a minus element are positioned on the same area $A_2$, they are removed. As there remains a minus element on area $A_0$ the plus element on area $A_3$ is replaced by one plus element on each of the areas $A_2$ and $A_1$, and two plus elements on the area $A_0$. This is correct since $2^3 = 2^2 + 2^1 + 2.2^0$. A plus element and the minus element positioned on the area $A_0$ are finally removed. At the end of these operations, plus elements are hence positioned on the areas $A_0$, $A_1$ and $A_2$, thus visually representing in binary form the result 7 of the subtraction operation on board B.

A multiplication operation of two numbers may obviously be represented in binary form on board B by representing an iterative adding operation, but one may also proceed in the following way. Hereby use may be made of elements of different colours for the multiplicand, for the multiplier and for the partial results obtained during the multiplication respectively or of elements with a multiplicand sign, with a multiplier sign and with a plus sign for the multiplicand, the multiplier and the partial results respectively. Anyhow these elements are hereinafter called M-elements for the multiplicand, $m$-elements for the multiplier and plus elements for the partial results:

The multiplicand and the multiplier are visually represented in binary form on board B by means of M-elements and $m$-elements respectively;

An $m$-element positioned on an area $A_x$ means that the multiplicand must be multiplied by $2^x$. Therefore this $m$-element is removed and replaced by a number of plus elements equal to the number of M-elements and positioned on areas representing values which are $2^x$ times larger than the values represented by the areas on which the M-elements are positioned;

Removing the M-elements;

Performing adding operations in the manner described above.

At the end of these operations, the result of the multiplication operation is visually represented in binary form on board B.

When for instance the multiplication of multiplicand 5 and multiplier 7 must be visually represented in binary form on board B, one proceeds as follows. Hereby reference is made to FIG. 4:

Multiplicand 5 is visually represented on board B by positioning N-elements on the areas $A_0$ and $A_2$, and multiplier 7 is visually represented in binary form on the same board B by positioning M-elements on the areas $A_0$, $A_1$ and $A_2$;

The M-element positioned on area $A_0$ is replaced by plus elements on the areas $A_0$ and $A_2$; the M-element positioned on area $A_1$ is replaced by plus elements on the areas $A_1$ and $A_3$ and the M-element positioned on area $A_2$ is replaced by plus elements on the areas $A_2$ and $A_4$;

The N-elements are then removed. At the end of these operations, an element is hence positioned on the areas $A_0$, $A_1$, $A_3$ and $A_4$ and two elements are positioned on area $A_2$. The latter elements are replaced by an element on area $A_3$ and the two elements then appearing on area $A_3$ are replaced by an element on area $A_4$. The two elements on this area are replaced by an element on area $A_5$. Finally plus elements are hence positioned on the areas $A_0$, $A_1$ and $A_5$, thus visually representing in binary form the result 35 of the multiplication operation.

The above multiplication procedure is based on the fact that $$5 \times 7 = (2^2+2^0).(2^2+2^1+2^0)$$
$$= (2^2+2^0).2^2 + (2^2+2^0).2^1 + (2^2+2^0).2^0$$
$$= 2^2.2^2 + 2^0.2^2 + 2^2.2^1 + 2^0.2^1 + 2^2.2^0 + 2^2.2^0$$

and that multiplying by $2^2$, $2^1$ and $2^0$ of the value $2^x$ represented by an element of value 1 positioned on the area $A_x$ is obtained by shifting this element to the area $A_{x+2}$, $A_{x+1}$ and $A_x$ respectively.

When the multiplication of a plurality of numbers must be visually represented in binary form, the above described multiplication operation is obviously repeatedly applied.

When the division of two numbers must be visually represented in binary form on board B, this is done by representing an iterative subtraction performed in the manner described above.

Obviously board B of FIG. 1 may also comprise areas $A_{-1}$, $A_{-2}$ ... $A_{-n}$ representing the successive powers $2^{-1}$, $2^{-2}$ ... $2^{-n}$ respectively. This permits to represent fractions of the unit.

Instead of calculating in a binary number system (radix $R=2$), one may also calculate in number systems with another radix and also visually represent these calculations on a board. For instance when one likes to represent calculations in a ternary number system, i.e. a system with radix $R=3$, one must use a board B, the areas of which represent the powers $3^0$ to $3^n$ or $3^{-n}$ to $3^{+n}$, and elements E representing ternary bits and adapted to be positioned on these areas. Hereby these elements have the value 1 or 2 since ternary bits may have the value 0, 1 or 2. One may however still use elements with value 1 on condition that two such elements are positioned on an area when the value of the ternary bit is 2. For instance, in a ternary system the above number 54 is represented by 4 ternary bits $d_3d_2d_1d_0 = 2000$ since $54 = 2.3^3 + 0.3^2 + 0.3^1 + 0.3^0$ and on a board this number is visually represented in ternary form by one element of value 2 or two elements of value 1 positioned on an area $A_3$ representing $3^3$.

The equipment for teaching mathematics shown on FIG. 5 is based on the fact that any number may be represented in a binary coded decimal number system, i.e. a number system with radix $R'=10$ but wherein each of the values 0 to 9 of the decimal digits $d_0$, $d_1, \ldots, d_n$ of the number is represented in binary form (radix $R=2$) according to the following table:

| | |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

This equipment includes a number of juxtaposed square boards $B_0$ to $B_p$ and a plurality of circular elements such as E. The upper surface of each of these boards $B_0$ to $B_p$ is divided in 4 identical square areas $A_0$ to $A_4$ of different colours. The elements such as E are so coloured that when positioned on the areas $A_0$ to $A_4$ they contrast with the colours thereof.

In the same manner as described above in relation to FIG. 1, the areas $A_0$ to $A_4$ of each board such as $B_x$ represent respective ones of the successive powers of radix $R=2$, i.e. $2^0$, $2^1$, $2^3$ and $2^4$ or 2, 4, 8 and 16. By positioning an element E on one of these areas $A_0$ to $A_4$ the partial product of the binary bit of value 1 by the corresponding power of 2 is visually represented on this board, and by positioning one element on each of two or more of the areas $A_0$ to $A_4$ the number equal to the sum of the respective partial products is visually represented in binary form on this board. By positioning elements on the areas of each board $B_x$ the above ten possible values 0 to 9 of a decimal digit may hence be visually represented in binary form on this board. Hereby it should be noted that although the values 10 to 15 of such a decimal digit may also be represented on the corresponding board this is not done since each digit may only have one of ten values 0 to 9.

The above boards $B_0$ to $B_p$ are now used to visually represent the values of the $p+1$ decimal digits of a number in a binary form, so that this number is then visually represented in a binary coded decimal form. It may therefore also be said that the boards $B_0$ to $B_p$ considered as units each represent the product of the above sum of partial products by a respective one of the powers $10^0$ to $10^p$ respectively.

When the adding operation of two numbers must be visually represented in binary coded decimal form on the boards $B_0$ to $B_p$, a procedure analogous to that described in relation to FIG. 1 is followed. These numbers are now however represented in binary coded decimal form and when elements are positioned on the areas $A_1$ and $A_3$ representing $2^1$ and $2^3$ of a board $B_x$, they are removed and replaced by an element on the area representing $2^0$ of the board $B_{x+1}$. This is correct since $$(1.2^1 + 1.2^3).10^x = 1.2^0.10^{x+1}$$

For instance, when the adding operation of the numbers 54 and 7 must be visually represented in binary coded decimal form on the boards $B_0$ and $B_1$, one proceeds as follows. Hereby reference is made to FIG. 6:

Number 54 is visually represented in binary coded decimal form on the boards $B_0$ and $B_1$ by positioning elements of value 1 on the area $A_2$ of board $B_0$ and on the areas $A_0$ and $A_2$ of board $B_1$;

Number 7 is visually represented on board $B_0$ by positioning elements of value 1 on the areas $A_0$, $A_1$ and $A_2$ thereof;

Since two elements are thus positioned on area $A_2$ of board $B_0$, they are replaced by an element on area $A_3$ of $B_0$. Elements being then positioned on the areas $A_1$ and $A_3$ of board $B_0$, they are replaced by an element on area $A_0$ of board $B_1$. As two elements are then positioned on area $A_0$ of board $B_1$, they are replaced by an element on area $A_1$ of $B_1$. At the end of these operations elements are hence positioned on the areas $A_0$ of $B_0$ and $A_1$ and $A_2$ of $B_1$, thus visually representing the result 61 of the adding operation in binary coded decimal form.

When the subtraction of two numbers must be visually represented in binary coded decimal form on the boards $B_0$ and $B_1$, one proceeds in an analogous way as described above in relation to FIG. 1, bearing in mind however that an element positioned on the area $A_0$ of a board $B_x$ corresponds to elements positioned on the areas $A_1$ and $A_3$ of the adjacent board $B_{x-1}$.

For instance when the subtraction of minuend 12 and subtrahend 5 must be visually represented on the boards $B_0$ and $B_1$, one proceeds as follows. Hereby reference is made to FIG. 7.

Minuend 12 is visually represented in binary coded decimal form by positioning plus elements on the areas $A_1$ of board $B_0$ and $A_0$ of board $B_1$;

Subtrahend 5 is visually represented in binary code decimal form by positioning minus elements on the areas $A_0$ and $A_2$ of board $B_0$;

The plus element on area $A_0$ of board $B_1$ is replaced by plus elements on the areas $A_1$ and $A_3$ of board $B_0$. The two plus elements then positioned on area $A_1$ are replaced by a plus element on area $A_2$ and since a minus element is already positioned on this area, both these plus and minus elements are removed. The plus element positioned on area $A_3$ of board $B_0$ is then replaced by a plus element on each of the areas $A_1$ and $A_2$ of board $B_0$ and by two plus elements on the area $A_0$ of the same board. A plus element and the minus element then positioned on the latter area $A_0$ are removed. At the end of these operations plus elements are hence positioned on the areas $A_0$, $A_1$ and $A_2$ of board $B_0$, thus visually representing in binary coded decimal form the result 7 of the subtraction operation.

A multiplication operation is preferably visually represented in binary coded decimal form by an iterative adding operation and a division operation is preferably visually represented in the same form by representing an iterative subtraction operation.

Instead of visually representing calculations in a binary coded decimal number system, one may also visually represent calculations in a ternary coded decimal number system, i.e. a system with radix $R'=10$ but wherein each of the decimal digits of a number is represented in ternary form $(R=3)$ according to the following table:

| | |
|---|---|
| 0 | 000 |
| 1 | 001 |
| 2 | 002 |
| 3 | 010 |
| 4 | 011 |
| 5 | 012 |
| 6 | 020 |
| 7 | 021 |
| 8 | 022 |
| 9 | 100 |

In this case one may make use of the apparatus shown in FIG. 8, wherein boards $B_0$ to $B_p$ are provided for representing respective ones of the $p+1$ decimal digits of a number. The surface of each such board is divided in three triangular areas $A_0$, $A_1$ and $A_2$ which represent the powers $3^0$, $3^1$ and $3^2$ respectively and on which an element such as E, representing a ternary bit of value 1 or 2 may be positioned. One may however also use elements of value 1 and position one or two of them on an area depending on the ternary bit being equal to 1 or 2. A calculation is performed in an analogous way as above described for a binary coded decimal number system. However, elements of total value 3 positioned on an area $A_x$ are now to be replaced by an element of value 1 on the area $A_{x-1}$ and elements of value 1 positioned on the areas $A_1$ and $A_3$ of board $B_x$ are to be replaced by an element of value 1 on the area $A_0$ of board $B_{x+1}$ and vice-versa since $(3^0 + 3^2).10^x = 1.3^0.10^{x+1}$.

From the above it follows that a number having $p+1$ decimal digits may be represented in a binary coded decimal form ($R'=10$, $R=2$) by means of $p+1$ groups of $n=4$ areas and in a ternary coded decimal form ($R'=10$, $R=5$) by means of $p+1$ groups of $n=3$ areas. Hereby $n=4$ and $n=3$ are determined by the inequalities $2^3<10<2^4$ and $3^2<10<3^3$ respectively. Generalizing, a number having $p+1$ decimal digits may be represented in an R-coded decimal form ($R'=10$, $R$) by means of $p+1$ groups of $n$ areas, $n$ being determined by $$R^{n-1}<10\leq R^n$$

Numbers with a decimal point may be visually represented by the above boards $B_0$ to $B_p$ and by using a tag representing the decimal point and by positioning it between the boards representing the decimal digits separated by the decimal point.

In connection with the embodiment of the equipment shown in FIG. 1, it should be noted that the areas $A_0$ to $A_n$ should not necessarily form part of the upper surface of a same board B but may for instance be constituted by the upper surfaces of individual boards respectively. Also these areas $A_0$ to $A_n$ must not necessarily be positioned in a single row, but could for instance be arranged in two adjacent rows: the lower one for the even powers of 2 and the upper one for the odd powers of 2.

With respect to the embodiments of the equipment shown in FIGS. 5 and 8, it should be noted that for each group of four areas $A_0$ to $A_3$, respectively three areas $A_0$ to $A_2$ arranged on a board $B_x$, the areas $A_1$ and $A_3$ respectively $A_1$ and $A_2$ have been positioned on the left hand side of this board in order to visually indicate that the adjacent board $B_{x+1}$ is used for representing a decimal digit of higher rank and since it is then easy to remind that when elements are positioned on the areas $A_0$ and $A_3$ respectively $A_0$ and $A_2$ of a board $B_x$, they have to be replaced by an element on the area $A_0$ of the adjacent board $B_{x+1}$.

Instead of being square or triangular, the boards B (FIG. 1) and $B_0$ to $B_p$ (FIGS. 5, 8) may have any suitable shape. This is also the case for the areas $A_0$ to $A_n$ (FIG. 1), $A_0$ to $A_3$ (FIG. 5) and $A_0$ to $A_2$ (FIG. 8). Moreover, instead of being differently coloured, these areas could also directly bear an indication of their value. This is also the case for the elements.

In order to be able to still use the equipment when the boards are in an inclined or vertical position these boards and the elements may be so constituted that the latter elements can be held on the boards by magnetic action. For instance, the upper surface of these boards may be coated with a magnetic material and the elements may be permanent magnets. Such an equipment is particularly adapted to be used by a teacher since the boards must then be fixed on a blackboard.

The above boards may be made in any suitable lightweight and scratch resistant material and may also be transparent in order to permit projection on a screen.

Instead of representing numerical values the areas and elements may represent any other magnitude e.g. an area may represent 2 square meters and an element may represent 1 meter.

While the principles of the invention have been described above in connection with specific apparatus, it is to be clearly understood that this description is made only by way of example and not as a limitation on the scope of the invention.

We claim:

1. Equipment for teaching mathematics comprising:
   at least one board having a surface which defines a plurality of areas, said plurality of areas including $p+1$ groups of four areas, and said four areas representing respective ones of the successive increasing powers ($p$) of radix R equal to two, starting with $R^0$;
   a plurality of elements, each element representing a numerical value one and being selectively positionable on said areas, such that said $p+1$ groups of four areas together with said elements represent respective ones of the $p+1$ decimal digits of a number in binary code and represent this number in a binary coded decimal form; and
   each group of four areas including a left hand area representing the values $2^1$ and $2^3$, and a right hand area representing the values $2^0$ and $2^2$;
   whereby elements on said left hand areas whose value total ten in decimal notation may be replaced by an element on the $2^0$ area of the next group to the left.

2. Equipment according to claim 1 wherein the areas of each group of four areas represent from right to left and from below to above the values $2^0$, $2^1$, $2^2$ and $2^3$ respectively.

3. Equipment according to claim 2 wherein said areas have different colors.

4. Equipment according to claim 3 wherein said elements are colored so that when positioned on said areas they contrast with the colors thereof.

5. Equipment according to claim 2 wherein said areas bear indicia corresponding to the values represented by these areas.

6. Equipment according to claim 5 wherein said elements are provided with other indicia corresponding to the function performed by these elements.

7. Equipment according to claim 3 wherein said board and said elements are so constituted that the elements can be held on said board by magnetic action.

8. Equipment according to claim 3 wherein said groups of four areas constitute surfaces of juxtaposed boards respectively.

References Cited

UNITED STATES PATENTS

| | | | |
|---|---|---|---|
| 1,836,870 | 12/1931 | Quer | 35—70 |
| 2,502,238 | 3/1950 | Wade et al. | 35—31(.6) |
| 2,722,754 | 11/1955 | Slote | 35—31(.6) |
| 3,138,879 | 6/1964 | Flewelling | 35—32 |
| 3,452,454 | 7/1969 | Easton et al. | 35—31 |

WILLIAM H. GRIEB, Primary Examiner